Sept. 5, 1939.    E. A. WHITE    2,171,820
LICENSE PLATE ASSEMBLY
Filed Jan. 6, 1938
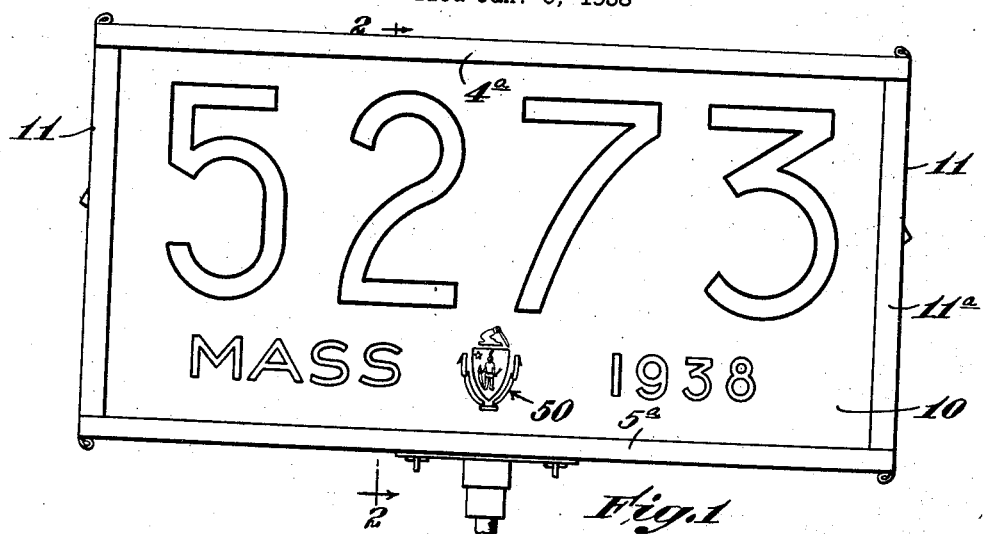
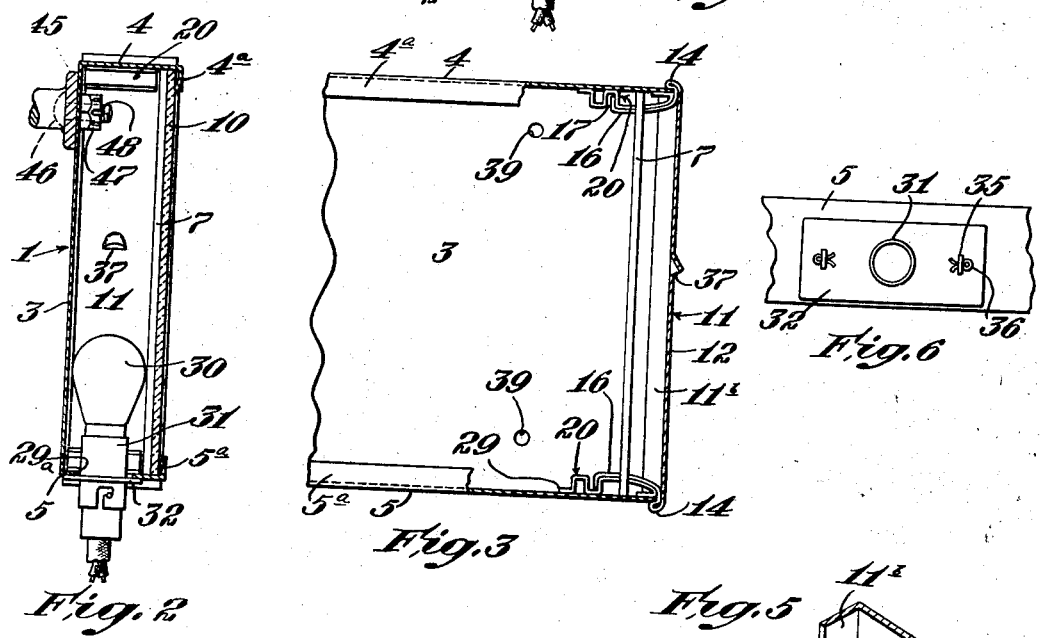
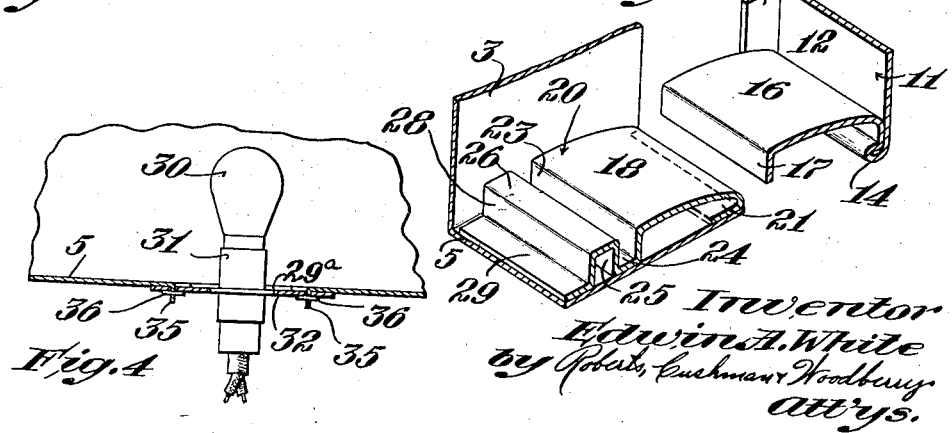

Patented Sept. 5, 1939

2,171,820

UNITED STATES PATENT OFFICE 2,171,820

LICENSE PLATE ASSEMBLY

Edwin A. White, Quincy, Mass.

Application January 6, 1938, Serial No. 183,669

5 Claims. (Cl. 40—132)

This invention relates to improved license plate assemblies for motor vehicles, and more particularly to theft-proof assemblies of this character.

An important feature of this invention involves the provision of a frangible license plate which is disposed in a suitable holder in such a manner that breaking of the plate is necessary in order to permit its removal from the holder. The holder, however, is constructed so that it can readily be assembled without necessity for employing special tools when the plate is initially installed therein.

The holder preferably comprises a casing which may conveniently be formed of metal and which may contain a light bulb for illuminating the license plate. The latter is preferably formed of glass and may have differently colored translucent portions to define the identifying symbols such as numerals. The casing may provide a fixed body portion with flanges overlying the margins of the frangible plate, the casing, however, being provided with one removable wall which may be detached when the license plate has been broken and removed from the holder.

When the license plate is in place, the wall may be moved into position so that it is permanently secured in a manner to prevent its removal or the removal of the license plate without breakage of the latter. To permit such a desirable result, suitably protected snap fastener means may be employed. The holder may be provided with a removable support or closure on which the light bulb is mounted so that this bulb can be removed for replacement when desired, but so that such removal does not allow access to the fastening means to permit removal of the detachable wall of the holder without breakage of the license plate.

An arrangement of this character is particularly effective in preventing theft of license plates by criminals or meddlesome persons, and a broken plate is at once likely to attract the attention of police officers to the car bearing such a plate. Since plates of this character must be destroyed at the end of the year or other licensing period, there is little likelihood of old plates being criminally altered, as by a change of the dating thereof.

A further important feature of the invention involves the arrangement of the plate, the holder, and the source of illumination for the former so that the plate is very effectively illuminated at night and so that an unusually clear illumination is afforded at the rear of the car to attract the attention of vehicles following the vehicle bearing the plate.

A further feature of the invention involves the arrangement of the light bulb in a restricted housing so that the plate tends to be heated, particularly at night, thus aiding in melting snow from the plate so that the legibility thereof is aided during snow storms.

Obviously plates of this character may be inexpensively manufactured; for example, a suitably ground or frosted glass may be used as a base, and with the employment of suitable stencils and a colored, translucent paint, various color and number combinations may readily be obtained. If desired, the State seal or other rather intricate insignia may be moulded in the glass plate, thus making counterfeiting of the plates much more difficult. The housing for the license plate may be conveniently arranged so that it may be supported on a conventional bracket adapted to receive a conventional plate, one feature of the invention involving the provision of fastening means for securing the housing to such a conventional bracket so that the housing can not be removed in entirety from the bracket for application to another vehicle.

Plate assemblies of the present type may be employed both at the front and rear of vehicles, thus affording additional means for ready identification at night. In cases where ready interchangeability of plates is desirable, i. e., in the case of dealers, special plates can be provided to permit ready access to the fastening means associated with the removable walls of the holders.

In the accompanying drawing:

Fig. 1 is an elevational view of a license plate assembly constructed in accordance with this invention;

Fig. 2 is a section on line 2—2 of Fig. 1;

Fig. 3 is a section at right angles to the section of Fig. 2, but showing the construction at one end of the housing;

Fig. 4 is a sectional view showing the arrangement of the light support at the lower part of the housing;

Fig. 5 is an isometric view of the snap fastening means with the parts thereof separated and having portions broken away; and Fig. 6 is a bottom view of part of the assembly.

A license plate holder constructed in accordance with the present invention may include a housing which, when assembled, is of generally box-like form and the major portion of one wall of which is provided by a license plate of frangible material such as glass. The remainder of the housing may conveniently be formed of metal. The housing comprises a fixed casing portion 1 (Fig. 2) having a vertical wall 3, and upper and lower horizontal walls 4 and 5 which may be integral with the rear wall. The walls 4 and 5 are provided with coplanar vertically disposed flanges 4a and 5a respectively. Adjoining each end of the casing there may be tie bars 7 extending between the walls 4 and 5 and permanently fixed thereto as by welding. These bars preferably are spaced from the flanges 4a and 5a at a sufficient distance to cooperate therewith in defining a guideway into which the glass license plate 10 may be slid.

The casing portion 1 is provided with open ends through one of which the plate 10 may be slid. The housing may be provided with either one or two removable end walls but, as shown, I prefer to provided two similar end walls 11, one of which is shown in greater detail in Figs. 2 and 3. Such an end wall may comprise a vertical portion 12 and may be provided with inwardly curved integral end portions 14 provided by turning the metal back on itself. The metal is then continued so that it may extend about the end of the corresponding horizontal wall 4 or 5 of the casing 1 and may provide a hook-like securing element 16 which is somewhat resilient. This element may have a vertically disposed end portion 17 engageable in a corresponding recess on the fixed casing 1. For this purpose a sheet metal member 20 may be provided, this member having an end portion 21 in face-to-face engagement with a horizontal wall of the housing, as, for example, the wall 5 thereof, and the sheet metal then being bent backwardly to provide an upwardly and inwardly curved portion 18 which may have a cam-like engagement with the extremity 17 of the securing element when the end plate 11 is forced into place.

The inner end of the portion 18 of the element 20 is connected by a downwardly extending sheet metal portion 23 to a horizontal portion 24 secured as by welding in face-to-face engagement with the horizontal wall 5 of the housing. The sheet metal is then turned upwardly as indicated by numeral 25 to provide a section in closely parallel relation to the section 20. The sheet metal is then continued in a horizontal portion 26 which is connected by a vertical portion 28 to a third horizontal portion 29 engaging the horizontal wall 5 of the casing 1. At the upper corner of the housing a similar member 20 may be similarly arranged except that the upper member 20 is inverted relative to the lower member 20.

The end walls 11 may also be provided with inturned front and rear flanges 11a and 11b. The ends of the former may fit beneath the ends of the flanges 4a and 5a at the corners of the housing, while the latter may be in overlapping relation with the end 6 of wall 3.

Preferably the intermediate portions of the flanges 4a and 5a may normally tend to incline inwardly slightly so that when the license plate 10 is located in the housing, these portions of the flanges are sprung slightly out of their normal position so that the edges of these flanges firmly engage the outer surface of the license plate, thus providing substantially weather-tight joints along the margins of the plate.

The lower wall 5 of the casing 1, as shown in Figs. 2 and 4, may be provided with a central opening 29a through which the light bulb 30 and its socket assembly 31 may be inserted into the housing. For this purpose the socket assembly 31 may conveniently be supported on a closure plate 32 having slots which fit over depending ears 35 at either side of the opening, these ears being provided with openings to receive cotter pins 36 upon which the ends of the closure rest. The opening 29a preferably is of restricted size so that it may be practically impossible to insert and manipulate a tool through this opening to disengage the securing means for the end plates 11.

It is furthermore evident that the upstanding portions 25—26—28 of each member 20 also provide a guard adjoining the corresponding hook-like extension 17 of an end plate 11 in order to make it impossible to pry such an extension out of its normal position.

In order to facilitate ventilation of the interior of the housing, small openings 37 may be provided in each end plate 11, these openings being afforded by slitting and striking out the metal slightly, as shown in Figs. 2 and 3.

The casing 1 may conveniently be secured to a conventional bar or bracket 45 having slots to receive bolts extending from the license plate. In accordance with this invention, openings 39 may be formed in the vertical wall 3 of the casing 1 adjoining the ends thereof and carriage bolts 46 may be disposed in the slotted portions of the bracket 45 with their square shanks in engagement with the slots so that rotation of the bolts is prevented, the rounded heads of the bolts being exposed. The bolts may extend through the openings 39 and may receive castellated nuts 47 locked in place by cotter pins 48. It is evident that a fastening means of this character can not be removed without obtaining access to the interior of the housing as by breaking the glass number plate.

The license plate 10 itself may be formed of any suitable translucent, frangible material, but glass is preferred for this purpose since it may be obtained at low cost. If desired, the license plate may be supplied with a moulded glass insignia 50, such as the seal of the State as well as the conventional identifying symbols showing the license number of the vehicle, the State, and year of registration. While the license plate itself may be made in a variety of ways, I prefer to employ a frosted glass with its inner surface (the surface which is disposed inwardly when the license plate is assembled with the holder) suitably treated with a translucent colored paint or enamel so that the various symbols on the plate are clearly defined.

When it is desired to remove the plate from the holder, the plate is broken away so that access is afforded to the front of the assembly at least adjoining one end thereof, whereupon one of the fastenings 16 may be pried out of normal position by a screw driver or the like. Thereupon the corresponding end wall 11 may be removed and the parts of the broken plate which remain in the holder may then be removed, the broken plate being discarded. If desired, both end walls 11 may be removed in this manner.

When a new plate 10 is to be assembled with the housing, it is slid endwise between the bars 7 and the flanges 4a and 5a until its ends are properly positioned substantially even with the ends of the casing 1. Thereupon the end wall or end walls 11 may be snapped into position, the ends 17 of the securing elements 16 engaging the curved portions 18 of the elements 20 with a cam-like action until the ends of the securing elements snap into place between the sheet metal portions 23 and 25 of the elements 20. When the end walls are locked in place in this manner, it is evident that the license plate can not be removed without destroying the housing and necessitating the use of tools in such a manner that breakage of the license plate would almost certainly follow. Obviously a broken plate would at once attract the attention of police officers and thus be likely to lead to the arrest of a driver improperly using a plate. Since the plates are destroyed at the end of the period of registration (or when the car is sold), there is a further impediment to the use of unauthorized plates.

A plate of this character is very clearly visible at night, thus tending to reduce the mounting toll of night accidents; furthermore, a plate of this character, if on an exposed portion of the car, will tend to make a driver more careful to prevent minor collisions which might result in breakage of the frangible plate. Obviously devices of this character may be manufactured at low cost and the plates themselves can be prepared without necessity for expensive metal stamping operations.

When devices of this character are employed, authorized persons, such as dealers, may be provided with plates which are shorter than the housing so that access may be provided to the securing devices 16 without necessity for breaking the plates. It is evident that the present invention affords a simple, inexpensive and theft-proof license plate assembly which not only practically precludes unauthorized use of the license plate, but also affords several other advantages tending to increase the safety of motoring.

It should be understood that the present disclosure is for the purpose of illustration only and that this invention includes all modifications and equivalents which fall within the scope of the appended claims.

I claim:

1. License plate assembly of the class described comprising a casing having an upstanding main wall and upper and lower walls with coplanar, substantially vertical flanges, said casing also having end walls, one of which is detachably secured to the remainder of the casing, said end walls providing flanges to cooperate with said coplanar flanges in overlying the margins of a frangible license plate, the casing also including bars extending between the upper and lower walls in substantially parallel spaced relation to said coplanar flanges to cooperate therewith in providing a guideway to receive a license plate slid endwise into the casing, said end wall and the cooperating part of the casing providing snap fastening means capable of interengagement when the end wall is assembled with the casing, said fastening means being accessible for disengagement only through the space between said coplanar flanges, so that when a frangible license plate is located with its margins beneath said flanges access to said means is precluded unless the plate is broken.

2. License plate assembly of the class described comprising a casing having an upstanding main wall and upper and lower walls with coplanar, substantially vertical flanges, said casing also having end walls, one of which is detachably secured to the rest of the casing, said end walls providing flanges to cooperate with said coplanar flanges to overlie the margins of a frangible license plate, said end wall and the cooperating part of the casing providing snap fastening means capable of interengagement when the end wall is assembled with the casing and accessible for disengagement only through the space between said coplanar flanges, said fastening means comprising resilient hook-like elements at the upper and lower ends of the detachable end wall, and cooperating retainers on the upper and lower walls of the casing, said retainers having portions to engage said elements with a cam-like action as the end wall is being assembled with the remainder of the casing, said elements having protuberant parts closely spaced from said portions to provide narrow grooves to receive the ends of the elements.

3. License plate assembly of the class described comprising a sheet metal casing having an upstanding main wall, substantially parallel walls extending from the main wall, said last-named walls providing substantially coplanar flanges to overlap a license plate, walls extending between said substantially parallel walls and also providing flanges to overlap a license plate, one of the last-named walls being removable, the removable wall and adjoining portions of the casing providing snap fastenings capable of interengagement when the removable wall is assembled with the casing, said fastenings being accessible for disengagement only through the space between the coplanar flanges, and a bar extending between portions of the substantially parallel walls which are remote from said main wall, thereby to resist prying of the casing to release a license plate overlapped by the flanges.

4. License plate assembly of the class described comprising a sheet metal casing having an upstanding main wall, substantially parallel walls extending from the main wall, said last-named walls providing substantially coplanar flanges to overlap a license plate, walls extending between said substantially parallel walls and also providing flanges to overlap a license plate, one of the last-named walls being removable, the removable wall and adjoining portions of the casing providing snap fastenings capable of interengagement when the removable wall is assembled with the casing, said fastenings being accessible for disengagement only through the space between the coplanar flanges, and a pair of bars extending between end portions of the substantially parallel walls which are remote from said main wall, thereby to resist prying of the casing to release a license plate overlapped by the flanges.

5. License plate assembly of the class described comprising a box-like metal body portion, a removable wall for the same, said body portion with the movable wall forming a casing with an open side to receive a frangible license plate, a wall of the body portion providing an opening, a closure for said opening carrying a socket for a light bulb, said closure being movable to uncover said opening and afford access to said bulb, snap fastenings having cooperating parts on the removable wall and the casing, said fastenings comprising wide, resilient hook-like elements, and cooperating parts over which the hook-like elements fit closely throughout substantially the entire lengths of the latter, said fastenings also being remote and practically inaccessible from said opening, thus to preclude release of the fastenings unless the plate is broken.

EDWIN A. WHITE.